(12) United States Patent
Svensson et al.

(10) Patent No.: US 11,358,806 B2
(45) Date of Patent: Jun. 14, 2022

(54) SYSTEM AND METHOD OF ORIENTING A PLURALITY OF STUDS

(71) Applicant: Nordiska Truss AB, Falkenberg (SE)

(72) Inventors: Åke Svensson, Falkenberg (SE); Daniel Bäckström, Falkenberg (SE)

(73) Assignee: Nordiska Truss AB, Falkenberg (SE)

( * ) Notice: Subject to any disclaimer, the term of this patent is extended or adjusted under 35 U.S.C. 154(b) by 0 days.

(21) Appl. No.: 17/266,301

(22) PCT Filed: Jul. 12, 2019

(86) PCT No.: PCT/EP2019/068807
§ 371 (c)(1),
(2) Date: Feb. 5, 2021

(87) PCT Pub. No.: WO2020/035236
PCT Pub. Date: Feb. 20, 2020

(65) Prior Publication Data
US 2021/0300688 A1   Sep. 30, 2021

(30) Foreign Application Priority Data
Aug. 14, 2018  (SE) .................................. 1850976-0

(51) Int. Cl.
*B65G 47/248* (2006.01)
*B65G 47/32* (2006.01)
*B07C 5/14* (2006.01)

(52) U.S. Cl.
CPC ........... *B65G 47/248* (2013.01); *B65G 47/32* (2013.01); *B07C 5/14* (2013.01); *B65G 2201/0217* (2013.01)

(58) Field of Classification Search
CPC .................. B65G 47/248; B65G 47/32; B65G 2201/0217; B65G 47/252; B65G 47/52; B07C 5/14
(Continued)

(56) References Cited

U.S. PATENT DOCUMENTS 5,605,216 A    2/1997  Raybon et al.
6,374,714 B1 * 4/2002  Rousseau ................ B27B 31/04
                                                     83/13
(Continued)

FOREIGN PATENT DOCUMENTS

DE             3150375 A1   11/1982
DE        202017104924 U1   10/2017

OTHER PUBLICATIONS

International Search Report and Written Opinion dated Oct. 18, 2019, issued in International Patent Application No. PCT/EP2019/068807, filed Jul. 12, 2019, 13 pages.
(Continued)

*Primary Examiner* — Gregory W Adams
(74) *Attorney, Agent, or Firm* — Christensen O'Connor Johnson Kindness PLLC

(57) ABSTRACT

The invention relates to a system and a method configured to orient a plurality of studs into one and the same curvature based orientation. The system comprises a conveyor (108; 105) having a feeding direction and being arranged to receive a stud (200A, 200B) being oriented with its longitudinal extension in a direction transverse to the feeding direction. The system further comprises a sensor arrangement (160) configured to measure the curvature of the stud (200A, 200B) as seen along its longitudinal extension and as seen in a major plane of the conveyor (108; 105). Additionally, the system comprises a turning arrangement (170) configured to turn the stud (200A, 200B) 180 degrees around its longitudinal extension.

10 Claims, 9 Drawing Sheets

(58) Field of Classification Search
USPC .. 198/603, 577, 370.05, 347.3, 818, 457.01, 198/456
See application file for complete search history.

(56) References Cited

U.S. PATENT DOCUMENTS

| | | |
|---|---|---|
| 10,426,175 B2 | 10/2019 | Meininger et al. |
| 2009/0000910 A1 | 1/2009 | Perreault |
| 2017/0057113 A1* | 3/2017 | Aylsworth .............. B27B 31/04 |
| 2017/0137231 A1* | 5/2017 | Staal .................... B65G 47/248 |
| 2017/0349380 A1 | 12/2017 | Smith et al. |

OTHER PUBLICATIONS

Swedish Search Report dated Jan. 30, 2019, issued in Swedish Application No. 1850976-0, filed Aug. 14, 2018, 3 pages.
Examination Report No. 1 for Standard Patent Application, dated Apr. 22, 2022, issued in corresponding Australian Application No. 2019320978, filed Jul. 12, 2019, 13 pages.

\* cited by examiner

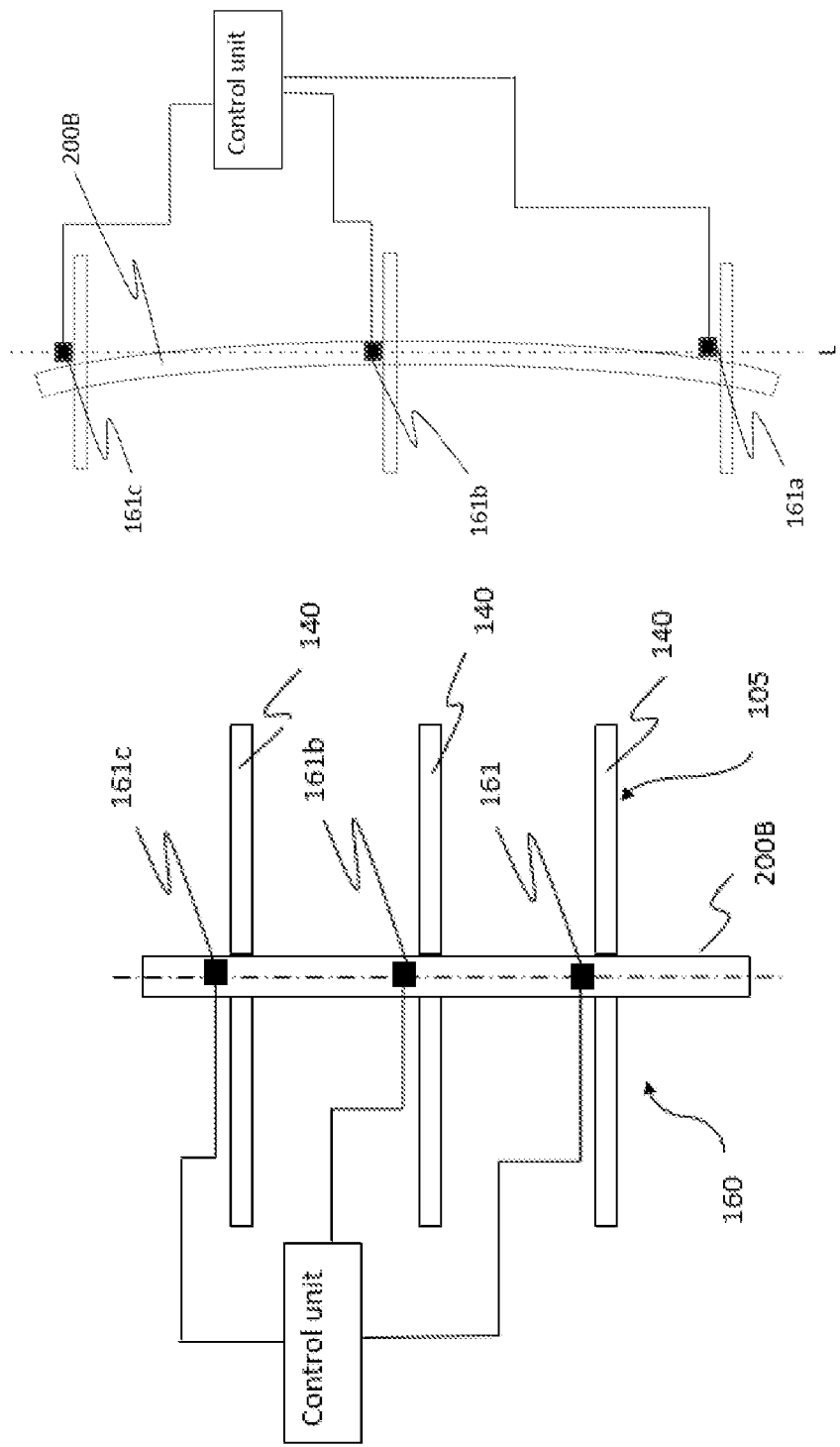

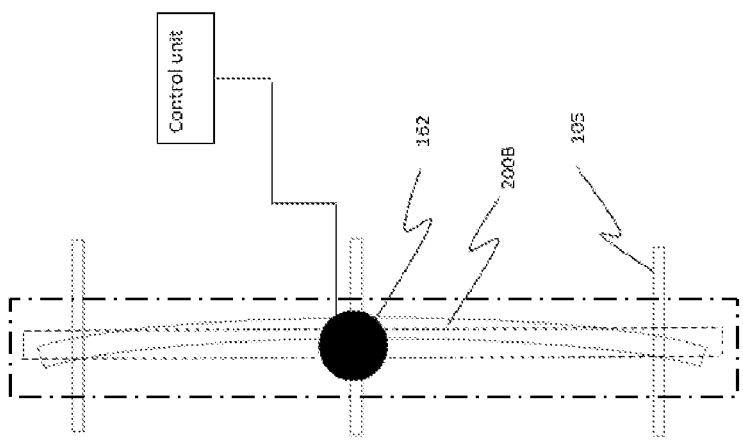
Fig. 5C
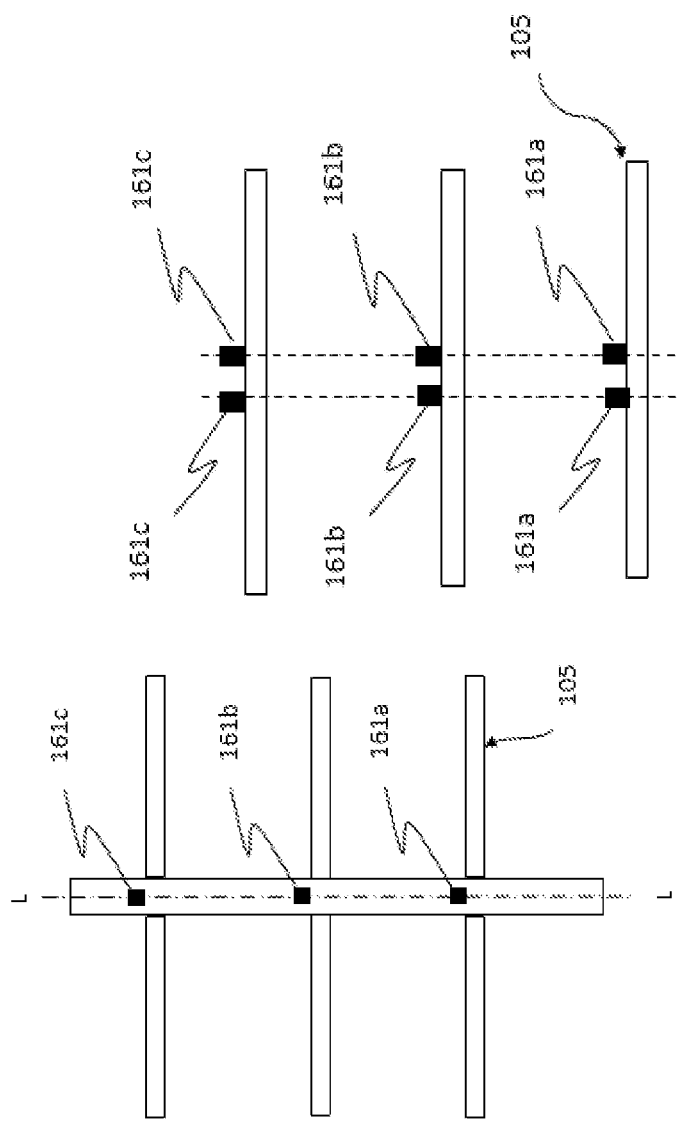
Fig. 5B
Fig. 5A

SYSTEM AND METHOD OF ORIENTING A PLURALITY OF STUDS

TECHNICAL FIELD

The present invention refers to a system and a method of orienting a plurality of studs into one and the same curvature based orientation. The invention further refers to the use of such system in an establishment for prefabricated house manufacturing.

TECHNICAL BACKGROUND

It is well known in the art to provide prefabricated housings where a plurality of prefabricated modules are manufactured in a factory and then shipped to a building site where they are assembled to form a housing. Examples of modules are wall frames, floors and roof trusses. The modules are typically produced in high speed production lines.

Depending on the design and size of the individual module, the input raw material in the form of wood studs of a certain cross sectional dimension is provided on pallets to the production line. The palletized studs are provided pre-cut in a desired length. Since a production plant should allow a certain degree of flexibility, a plurality of pallets with different dimensions must be readily accessible. This applies both in cross section and length. This requires a lot of stock articles, available storage place and also a logistic system which allows easy transportation to and from the production line. This increases the production costs and hence the price on the end product. There is hence a need for a more cost efficient solution which reduces costs for storage and transport of raw material to the production line.

Further, since wood is a natural product, there is a variance in the curvature as seen along the longitudinal extension caused by the milled wood absorbing moisture from the air during storing. The absorption causes warping and shrinking of the wood whereby a piece of wood, such as a stud, that once has been milled to a correct cross sectional dimension and to a linear extension may change its geometry. This is known as crowning. A crown will be the edge of the wood that warps upward in the center when holding it on edge. Highly exaggerated, the crowning may be seen as the wood having a single curved longitudinal extension. When installing the studs it is of importance that the studs crown all face the same direction. Otherwise, in e.g. a finished wall, some studs that have warped toward the outside and some toward the inside will make it difficult to properly attach the finishes and produce a very unattractive finish as well as causing nail pops in the finish. In case of floor joists, ceiling joists, and roof rafters, the orientation is of even more importance because of structural aspects. Over time gravity can cause the lumber to warp or sag in a downward direction. If all of the natural crown are installed up then that effect will take a very long time to notice. If on the other hand, the joists were installed with the crown down, a floor, ceiling and roof would probably, if not immediately, very soon look like a bowl. Also if the crowns are not all the same then the floor, ceiling and roof will have noticeable rolls in them.

It is further a well-known fact that the more uniform raw material, the easier handling, and this is especially the case when it comes to highly automatized handling systems and high speed production lines.

SUMMARY

One object of the present invention is to provide a handling system that allows an automatized determination and correction of the orientation of studs.

Another object is to provide a handling system that allows determination and correction of the orientation of studs in a high-speed production line.

Yet another object is to provide a system that allows un-cut studs having mutually different lengths to be provided as raw material.

These and other objects are solved by a system configured to orient a plurality of studs into one and the same curvature based orientation, the system comprising: an upper conveyor comprising an upper surface configured to receive a package of studs; a separating arrangement configured to allow one stud at a time to be fed from the package of studs with a mutual distance to each other to a lower conveyor; the lower conveyor having a feeding direction and being arranged to receive a stud being oriented with its longitudinal extension in a direction transverse to the feeding direction; a sensor arrangement configured to measure the curvature of the stud as seen along its longitudinal extension and as seen in a major plane of the lower conveyor; and a turning arrangement configured to turn the stud 180 degrees around its longitudinal extension.

The system may be seen as a screening system that sorts and orients arbitrary arranged crowned studs into one and the same orientation. In the context of the invention, the term "one and the same curvature based orientation" should be understood as that all studs are oriented side by side with a convex longitudinal edge of a first stud facing a concave longitudinal edge of a subsequent stud. Thereby, all studs will be arranged with their crowning extending in the same orientation. Roughly speaking it may be seen as spooning. In its most simple form, the sensor arrangement may be configured to measure and provide a signal that may be used to determine if there is a need for turning the stud or not. A turning should be initiated if it is determined that the curvature of the measured stud is incorrect. Otherwise the stud should be allowed to pass. The conveyor may be a single conveyor or two or more, preferably three parallel sub-conveyors. The conveyor or sub-conveyors may be a belt conveyor or a chain conveyor. The invention should not be limited to the type of conveyor or the number of conveyors used.

The sensor arrangement may comprise at least one sensor being any of a photocell, a laser sensor, a radar sensor, a pressure sensor or an image sensor. The sensor arrangement may comprise a combination of two or more sensor types.

The sensor arrangement may be an array of a plurality of sensors. In the context of the invention, the term "array" should be understood as a group of sensors which are arranged in a determined pattern. The array may by way of example be a straight linear pattern with the sensors being arranged one after the other along a straight line. Alternative the array may be a pattern comprising several adjacent straight lines in which lines sensors are arranged one after the other. No matter pattern of the array, it is preferred that the individual sensors are arranged on a distance from each other and distributed in a direction transverse the feeding direction of the conveyor. In case of a straight linear pattern, it is preferred that at least three sensors are provided. Thereby, in the event not all three indicates a positive signal, i.e. a detection of a stud portion, this may be used as an indication of an incorrect orientation which may be corrected by turning the stud 180 degrees. Further, an array comprising several lines of sensors may be used to determine not only an incorrect orientation, but also to determine if the curvature is too curved. If too curved, it may be used as a signal of that the stud should be removed from the conveyor. It is to be understood that the similar effect may be provided for by using a single image sensor, where the curvature is determined by image analysis.

The system may comprise a positioning arrangement which forces the stud to be oriented substantially perpendicular to the feeding direction of the conveyor before the stud reaches the sensor arrangement. In case the conveyor comprises two or more parallel sub-conveyors, the positioning arrangement may comprise a reciprocating projection which is arranged in a fixed position adjacent each sub-conveyor. As the stud reaches the positioning arrangement, each projection may be set to a position in which it projects transverse the path of the conveyor. As the stud reaches and abuts the respective projection, any angular misalignment will be corrected by the speed of the leading end of the stud temporarily slowing down by that specific projection.

The system may further comprise a control unit, the control unit being configured to receive a signal from the sensor arrangement; determine whether or not the stud has an acceptable curvature as seen along its longitudinal extension and as seen in the major plane of the conveyor; and instruct the turning arrangement to turn the stud if it is determined that the stud has a non-acceptable curvature. By way of example, in the case of a straight-linear pattern with three sensors, if all three sensors indicate a detection of a stud portion, this is indicative of a correct curvature. Contrary, if not all three sensors indicate a detection of a stud portion, this is indicative of a non-acceptable curvature. In case the sensor arrangement is an image sensor, the signal from that image sensor may be handled by image analysis.

The turning arrangement may comprise at least one pivotable arm configured to be movable from a resting position in which it has no contact with the stud into a turning position in which it engages and lifts a first longitudinal edge portion of the stud to such extent that the stud is turned 180 degrees around its longitudinal extension. The turning arrangement is arranged in a position downstream the sensor arrangement. The pivotable arm may be pivotable around a support positioned below the conveyor. In case of the conveyor comprises a plurality of sub-conveyors, a pivotable arm may be arranged below each sub-conveyor.

The system may further comprise a cutting arrangement configured to cut at least one of the two free ends of the stud. The cutting arrangement is preferably arranged downstream the turning arrangement. It is further preferred that both free ends of the stud are cut. One end may be cut to provide a clean cut, whereas the other end may be used to cut the stud to a pre-set length. Thus, the cutting arrangement may comprise two cutting blades, one at each end of the stud. Before cutting the free ends, the stud may be pushed in the longitudinal direction towards an anvil.

According to another aspect, the invention refers to a method of orienting a plurality of studs into one and the same curvature based orientation, comprising the acts of:

arranging a package of studs on an upper conveyor;

separating, by using a separating arrangement, the plurality of studs arranged in the package of studs, thereby allowing one stud at a time to be fed to a lower conveyor with a mutual distance to each other;

positioning the stud on the lower conveyor with a longitudinal extension of the stud oriented in a direction transverse a feeding direction of the lower conveyor;

measuring, by using a sensor arrangement, the curvature of the stud as seen along its longitudinal extension and as seen in a major plane of the conveyor;

determining, based on input from said measuring, whether or not the stud has an acceptable curvature as seen along its longitudinal extension and as seen in a major plane of the conveyor; and if it is determined that the stud has a non-acceptable curvature, turning the stud 180 degrees around its longitudinal extension.

The system and its function discussed above is directly applicable also to the method, and to avoid undue repetition, reference is made to that discussion.

The act of determining whether or not the stud has an acceptable curvature may comprise receiving, by a control unit, a signal from the sensor arrangement; determining whether or not the stud has an acceptable curvature as seen along its longitudinal extension and as seen in the major plane of the conveyor; and instructing the turning arrangement to turn the stud 180 degrees around its longitudinal extension if it is determined that the stud has a non-acceptable curvature.

The act of turning the stud may comprise moving at least one pivotable arm from a resting position in which it has no contact with the stud into a turning position in which it engages and lifts a first longitudinal edge portion of the stud to such extent that the stud is turned 180 degrees around its longitudinal extension.

According to yet another aspect, the invention refers to the use of a system according to any of claims 1-6 in an establishment for prefabricated house manufacturing. The system and its advantages has been described in detail above and to avoid undue repetition, reference is made to the sections above which are equally applicable.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

FIGS. 4A and 4B illustrates highly schematically the operation of one embodiment of the sensor arrangement.

FIGS. 5A-5C illustrates highly schematically the operation of one embodiment of the sensor arrangement.

DETAILED DESCRIPTION

Figure 1:
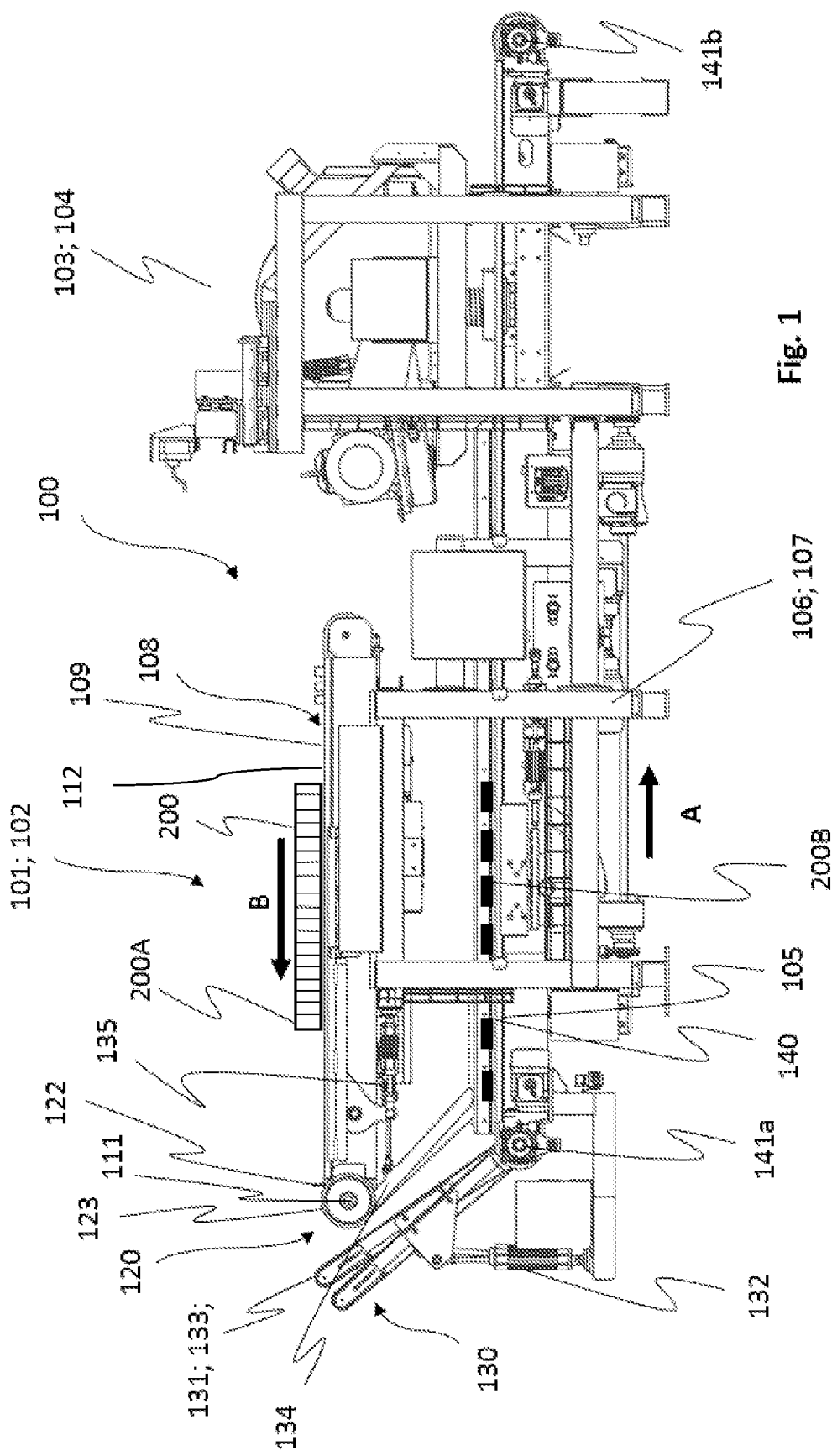
FIG. 1 discloses a side view of the system.

Now turning to FIG. 1, a side view of the system 100 is disclosed. The system 100 comprises a first section 101 forming a handling and turning arrangement 102 and an optional second section 103 forming a cutting arrangement 104. The second section 103 is arranged downstream the first section 101 and the two sections are arranged in communication with each other via a lower conveyor 105 that extends between the two sections. The lower conveyor 105 has a feeding direction as illustrated by arrow A.

Figure 2:
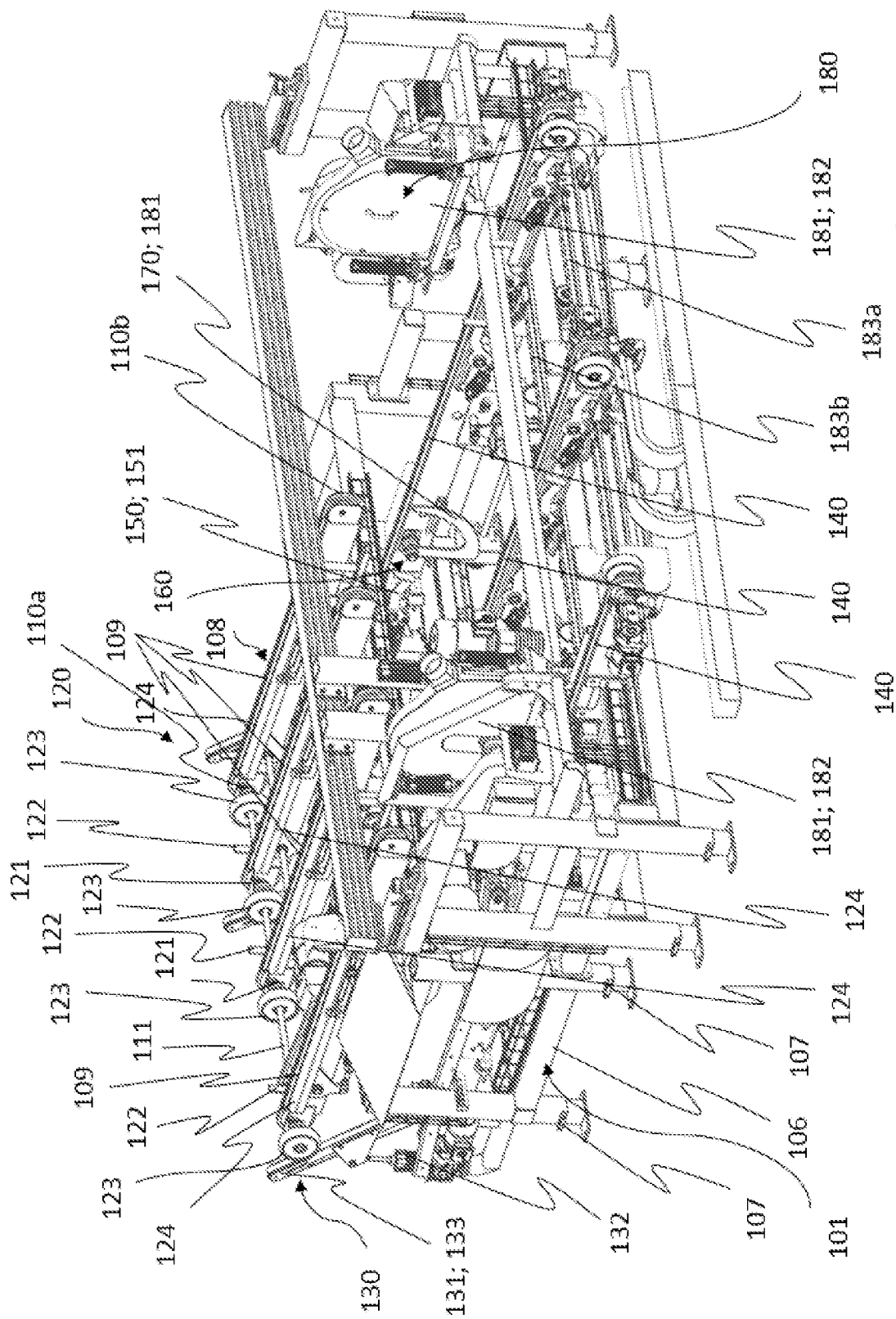
FIG. 2 discloses a perspective view of the system.

Turning to FIG. 1 and FIG. 2, the first section 101 comprises a frame 106 supported by legs 107. The frame 106 supports an upper conveyor 108 that comprises four parallel sub-conveyors 109 in the form of chain-conveyors. Each sub-conveyor 109 is supported by a first and a second driving wheel 110a, 110b. The first driving wheels 110a are supported and/or driven by a common motor driven shaft 111. All sub-conveyors 109 may thereby operate at the same speed. The upper conveyor 108 is preferably continuously driven.

The invention should not be limited to the type of conveyor or the number of sub-conveyors used. The sub-conveyors 109 have a feeding direction as illustrated by arrow B in FIG. 1. The feeding direction of the upper conveyor 108 is accordingly opposite the feeding direction of the lower conveyor 105.

The upper surface 112 of the upper conveyor 108 is configured to receive a package of studs 200 (schematically disclosed) arranged edgeways side by side in an abutting relation with their longitudinal extensions extending transverse the feeding direction of the upper conveyor 108. The package of studs 200 represents a single layer of studs that may be picked by a robot gripper (not disclosed), such as a vacuum plate from a pallet of studs (not disclosed).

A separating arrangement 120 is arranged adjacent the downstream end of the upper conveyor 108. The separating arrangement 120 comprises a set of sensors 121 configured to detect if a stud (200A, 200B) is approaching. The sensors 121 may by the way of example be photo sensors or laser sensors. The separating arrangement 120 further comprises a reciprocating projection 122 which is arranged in a fixed position adjacent each sub-conveyor 109. The reciprocation may be provided by using non disclosed pistons or using a cam shaft. Further, the separating arrangement 120 comprises a plurality of wheels 123 which are arranged on the same shaft 110a that drives the upper conveyor 108. Each wheel 123 has a larger diameter than the driving wheel 111a of the upper conveyor 108. Thereby, the peripheral velocity of the wheels 123 will be higher than the driving wheels 111a of the upper conveyor 108. Additionally, the separating arrangement 120 comprises a plurality of lifting blocks 124 which are movable in the vertical direction by non-disclosed pistons.

As the leading stud 200A of the package of studs 200 reaches the separating arrangement 120, the sensors 121 will detect the same and provide a signal to a non-disclosed control unit. The control unit is configured to set the projections 122 to a position in which they project in the vertical direction transverse the path of the upper conveyor 108. Thus, the package of studs 200 is prevented from falling from the upper conveyor 108 although the upper conveyor 108 as such has a continuous operation. Simultaneously, the control unit is configured to set the lifting blocks 124 into a vertically lifted position whereby at least the first stud 200A in the package of studs 200 is raised to a clearance position above the upper conveyor 108. The leading stud 200A will thereby come in contact with the wheels 123. Since the wheels 123 have a higher peripheral velocity than the driving wheels 111a of the upper conveyor 108, the leading stud 200A will be accelerated and hence be separated from the remaining studs in the package of studs 200. At the same time the projection 122 is returned to its lowered position. Accordingly, one stud 200B at the time will be allowed to leave the upper conveyor 108 and fall own onto the lower conveyor 105. The lifting blocks 124 are then lowered whereby the package of studs 200 comes in contact with the upper conveyor 108 anew and is moved forward. This process is repeated as long as there are any studs remaining in the package 200. As a result of the separating arrangement 120, the studs 200B will be arranged on the lower conveyor 105 with a longitudinal mutual distance to each other.

The system 100 further comprises a guide arrangement 130 that is arranged downstream the upper conveyor 108 in a position between the upper and the lower conveyors 108, 105. The guide arrangement 130 comprises a first set of guiding arms 131, with one guiding arm adjacent each sub-conveyor 109 of the upper conveyor 108. Each guiding arm 131 is pivotable attached to the frame 106 adjacent the lower conveyor 105 and forms an angle thereto. In the disclosed embodiment, a substantially vertically acting piston 132 operates the guiding arms 131 to be adjustable in a direction towards the upper conveyor 108. Further, each guiding arm 131 in the first set is provided with a conveyor belt 133 having a feeding direction (arrow C) towards the lower conveyor 105.

The guide arrangement 130 further comprises a second set of guiding arms 134 which are pivotably attached to the frame 106 adjacent the upper conveyor 108 and forms and angle thereto. In the disclosed embodiment, a substantially horizontally acting piston 135 operates the guiding arms 134 to be movable in a direction towards the guiding arms 131 of the first set.

The purpose of the guide arrangement 130 is to guide the stud 200A which leaves the upper conveyor 108 so that it falls to the lower conveyor 105 in a controlled manner held between the first and second sets of guiding arms 131, 134 without rolling over.

As a result of the angles of the first and second sets of guiding arms 131, 134 the stud 200B has changed orientation when entering the lower conveyor 105 so that instead of being standing edgeways it is lying down. The separated studs 200B are schematically illustrated on the lower conveyor 105.

The lower conveyor 105 comprises in the disclosed embodiment three parallel sub-conveyors 140. Each sub-conveyor 140 is supported by a first and a second driving wheel 141a, 141b. In the disclosed embodiment the second driving wheels 141b are motor driven. The lower conveyor 105 is preferably continuously driven. The sub-conveyors are disclosed as chain-conveyors. The invention should not be limited to the type of conveyor or the number of sub-conveyors used.

Figure 3B:
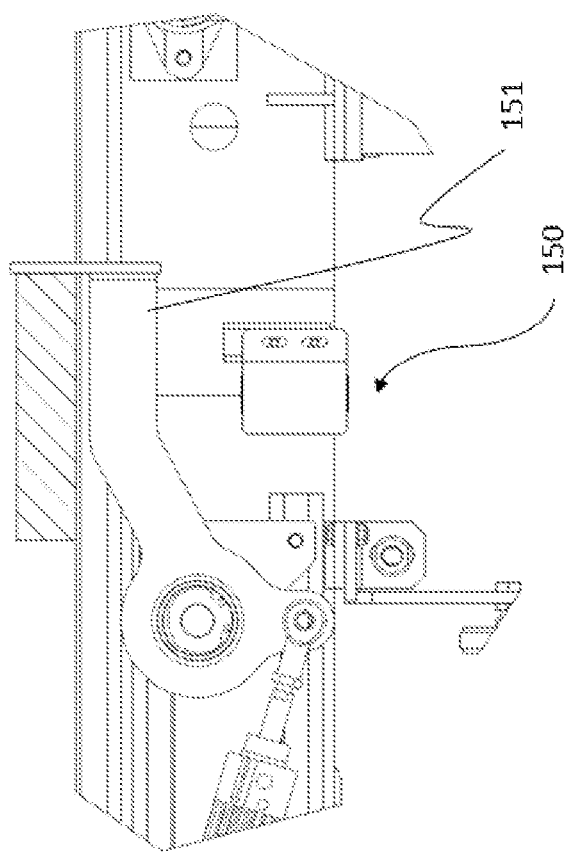
FIGS. 3A and 3B discloses highly schematically the operation of a positioning arrangement.
Figure 3A:
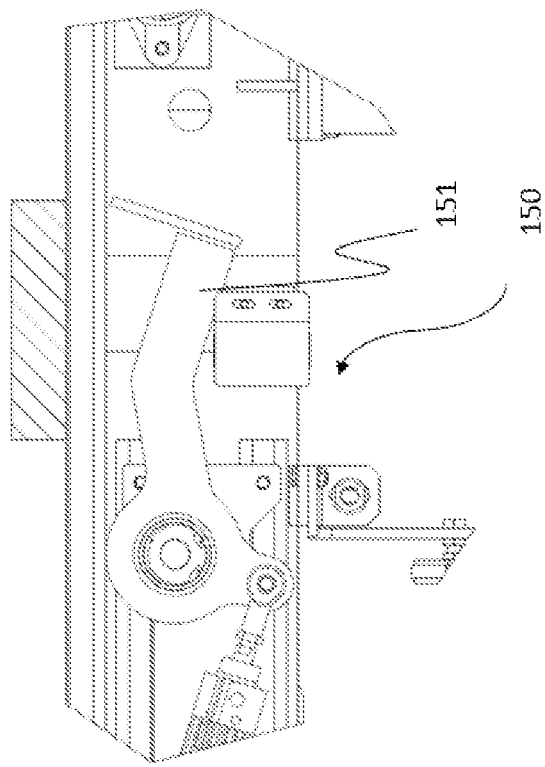

An optional positioning arrangement 150, see FIGS. 2 and 3A-3B may be arranged adjacent the upstream end of the lower conveyor 105. The positioning arrangement 150 comprises a rotatable projection 151 which is arranged adjacent each sub-conveyor 140. As the stud 200B approaches the positioning arrangement 150, each projection 151 is configured to be set to a position in which it projects transverse the path of the lower conveyor 105, see dashed lines. Thereby, as the leading edge of a stud 200B reaches and abuts the a first of the three projections 151 any misalignment of the stud 200B will be corrected by the leading end of the stud 200B being temporarily stopped. Since the stud 200B as a whole is fed by a plurality of sub-conveyors 140, the stud 200A will automatically align by turning into a direction perpendicularly to the feeding direction of the lower conveyor 105.

A sensor arrangement 160 is arranged downstream the positioning arrangement 150, see FIGS. 2 and 4A-4B. The sensor arrangement 160 is configured to measure the curvature of the stud 200B as seen along its longitudinal extension and as seen in a major plane of the lower conveyor 105.

The sensor arrangement 160 comprises in the disclosed embodiment, see FIGS. 4A and 4B, an array of three sensors 161a-161c. One sensor is arranged adjacent each sub-conveyor 140. The sensors 161a-161c are directed upwards to thereby be able to detect a stud 200B that passes over the sensor arrangement. The individual sensors 161a-161c are arranged on a distance from each other and distributed along a virtual line L that extends transverse, i.e. perpendicular to the feeding direction of the lower conveyor 105. The sensors 161a-161c are arranged to communicate with a control unit to be discussed below. A stud 200B passing the array of sensors 161a-161c is schematically illustrated. In FIG. 4A, each sensor 161a-161c indicates a positive signal, i.e. detection of a stud portion. This is an indication of that the stud 200B has an acceptable orientation and hence a correct curvature. In FIG. 4B, only one of the sensors 161a-161c, the sensor 161b in the middle, indicates a positive signal, i.e. a detection of a stud portion. This may be used as an indication of an incorrect orientation which may be corrected by turning the stud 200B 180 degrees. The signals from the sensors 161a-161c are transmitted to the control unit which processes the information and further controls the operation of a turning arrangement to be discussed below.

Now turning to FIGS. 5A-5C. As given above, the sensor arrangement 160 may be an array of a plurality of sensors. The sensor arrangement 160 may comprise at least one sensor being any of a photocell, a laser sensor, a radar sensor, a pressure sensor or an image sensor. The sensor arrangement 160 may comprise a combination of two or more sensor types. In the context of the invention, the term "array" should be understood as a group of sensors which are arranged in determined pattern. The array may by way of example be a straight linear pattern with the sensors 161a-161c being arranged one after the other along a straight line L, see FIG. 5A. In another embodiment, the array may be a pattern comprising several adjacent straight lines L1, L2 in which lines sensors 161a-161c are arranged one after the other, see FIG. 5B. No matter pattern of the array, it is preferred that the individual sensors 161a-161c are arranged on a distance from each other and distributed in a direction transverse the feeding direction of the lower conveyor 105. In case of a straight linear pattern, it is preferred that at least three sensors 161a-161c are provided. Thereby, in the event not all three sensors 161a-161c indicates a positive signal, i.e. a detection of a stud portion, this may be used as an indication of an incorrect orientation which may be corrected by turning the stud 200B 180 degrees. Further, an array comprising several lines L1, L2 of sensors 161a-161c may be used to determine not only an incorrect orientation, but also to determine if the curvature is too curved. If too curved, it may be used as a signal of that the stud should be removed from the conveyor.

FIG. 5C illustrates another example in which the sensor arrangement 160 uses a single image sensor 162 and where the curvature is determined by image analysis. In such embodiment, the image sensor 162, such as camera may be arranged above the lower conveyor 105 to be able to monitor studs 200A passing on the lower conveyor 105. The image sensor has a working area schematically illustrated by dash-dotted lines. The image captured by the image sensor 162 is compared, by using the control unit, with predetermined geometrical boundaries, illustrated by dashed lines, representing an acceptable orientation. If the orientation of the stud 200B is determined by the control unit to be non-acceptable, the stud 200B should be turned 180 degrees. This is made by the control unit communicating with and instructing the turning arrangement to be discussed below to turn the stud 200B.

Figure 6A:
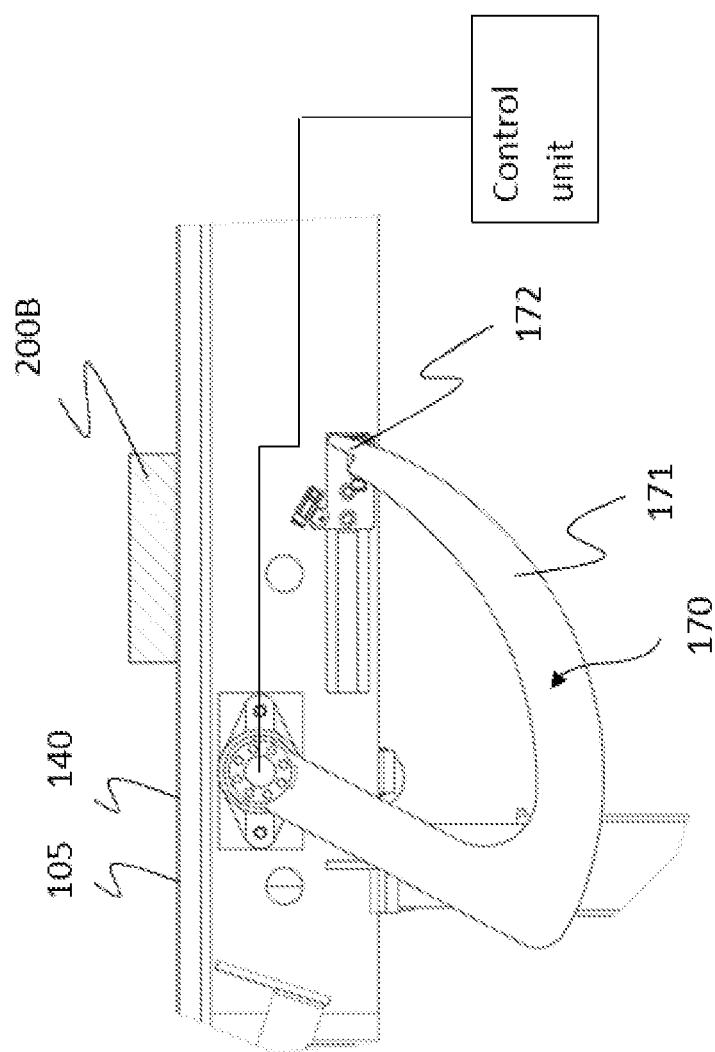
FIGS. 6A-6C illustrates schematically the operation of one embodiment of the turning arrangement.
Figure 6B:
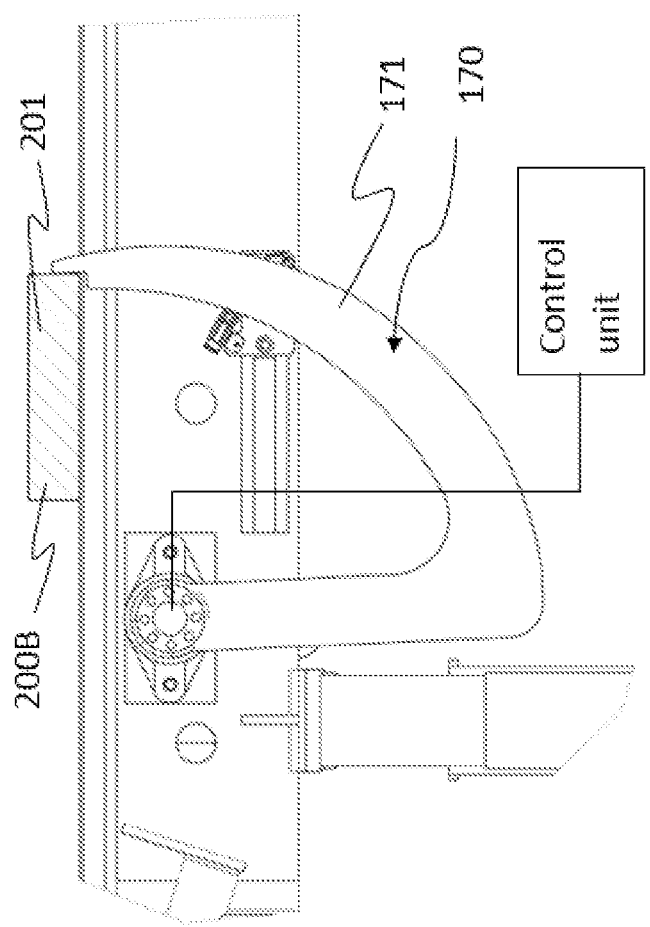
Figure 6C:
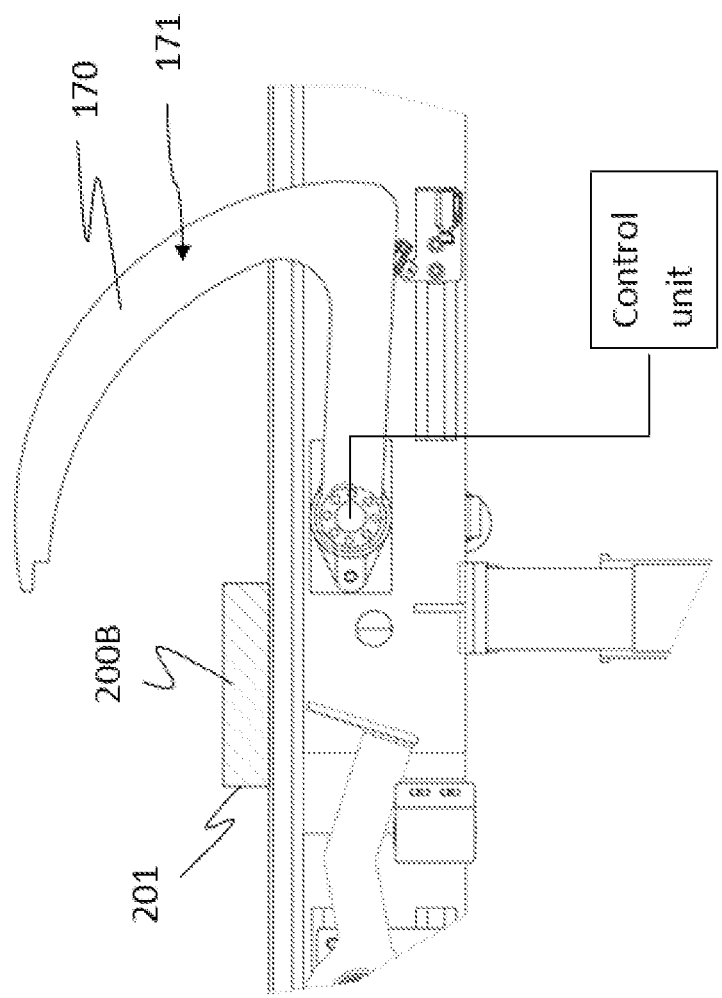

Now turning to FIG. 2 anew and also FIGS. 6A-6C, the system comprises a turning arrangement 170 which is arranged downstream the sensor arrangement 160. The turning arrangement 170 comprises in the disclosed embodiment three pivotable arms 171 (only one arm being disclosed in FIG. 2), where each arm 171 is pivotably attached to the frame 106 in a position below an adjacent sub-conveyor 140. The pivotable arm 171 has a curved extension with a finger 172 in its free end. Each pivotable arm 171 is configured to be movable from a resting position, see FIG. 6A in which the arm 171 has no contact with the stud 200B, into an engagement position, see FIG. 6B where it engages a first edge portion 201 of the stud 200B, and then to a turning position, see FIG. 6C in which it lifts and flips the stud 200B to such extent that the stud 200B is turned 180 degrees around its longitudinal extension. The turning arrangement 170 is configured to be operated based on instructions from the control unit related to the sensor arrangement 160. Accordingly, the turning arrangement 170 is configured to be operated only in the event the stud 200A approaching the turning arrangement 170 has been determined by using the sensor arrangement 160 to have a non-acceptable curvature. Otherwise the stud 200A should be allowed to pass. Accordingly, as a result of the system comprising a sensor arrangement 160, a control unit and a turning arrangement 170, all studs passing the turning arrangement 170 on the lower conveyor 105 will be oriented into one and the same orientation. Thus, the system may be seen as a screening system that sorts and orients arbitrary arranged single-curved studs into one and the same orientation where all studs are oriented side by side with a convex longitudinal edge of a first stud facing a concave longitudinal edge of a subsequent stud.

The system further comprises a cutting arrangement 180, see FIG. 2. The cutting arrangement 180 is arranged downstream the lower conveyor 105 and is configured to cut at least one of the two free ends of the stud 200B. It is preferred that both free ends of the stud 200B are cut. One end may be cut to provide a clean cut, whereas the other end may be used to cut the stud 200B to a pre-set length.

In the disclosed embodiment, the cutting arrangement 180 comprises two cutting machines 181. The cutting machines 181 may by way of example be circular saws having disc saw blades (not disclosed) encapsulated in protective housings 182. The cutting machines 181 are arranged in parallel with the longitudinal extension of the lower conveyor 105, i.e. one at each end of the stud 200B. Before cutting the free ends, the stud 200B may be pushed in its longitudinal direction towards a non-disclosed anvil. It is preferred that at least one of the cutting machines 181 is movable in a direction transverse the feeding direction of the lower conveyor 105 to thereby set the system to cut studs to a pre-set length. In the disclosed embodiment this is made by one of the cutting machines 181 being movable along rails 183a, 183b extending transverse the lower conveyor 105. The movement of the cutting machines 181 in view of each other may be made based on information communicated directly to the control unit from a CAD model representing a building module, such as a frame wall in which the stud later is to be used.

Figure 7:
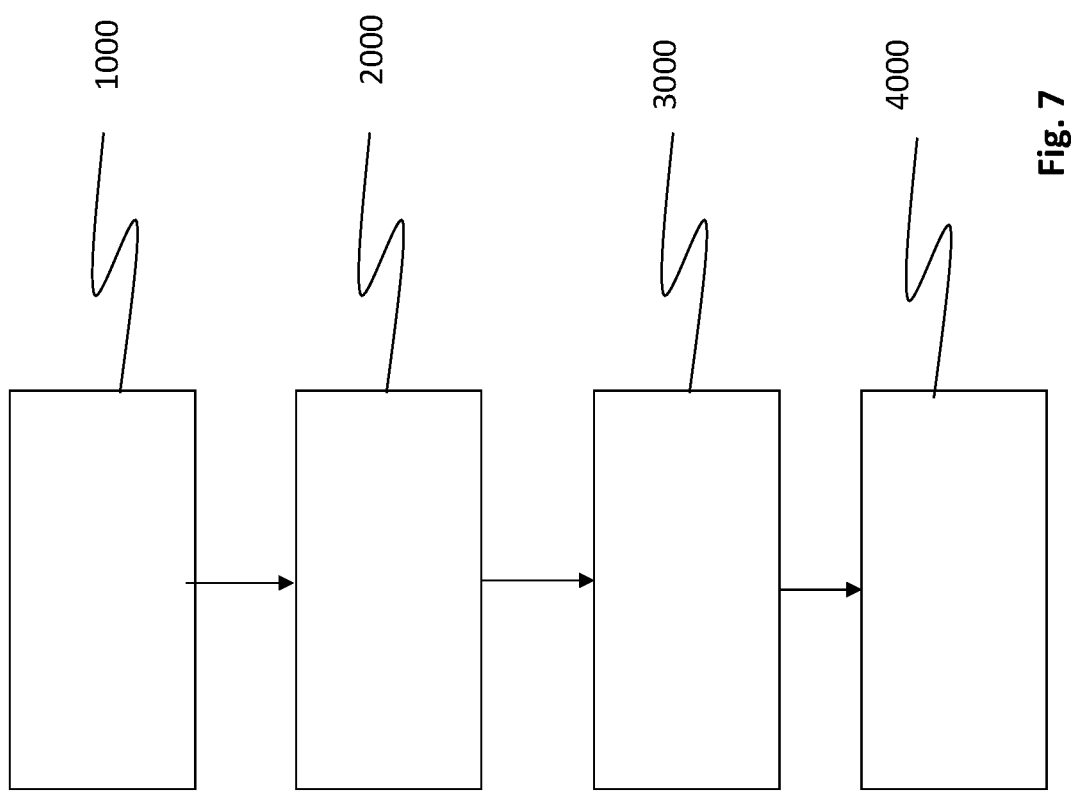
FIG. 7 is a flow chart disclosing the method of orienting a plurality of studs into one and the same curvature based orientation.

Now turning to FIG. 7 a method of orienting a plurality of studs 200A into one and the same curvature based orientation will be disclosed. The method comprises the following acts:

Arranging a package of studs 200 on an upper conveyor 108.

Separating, by using a separating arrangement 120, the plurality of studs 200A, 200B arranged in the package of studs 200, thereby allowing one stud 200A, 200B at a time to be fed to a lower conveyor 105 with a mutual distance to each other.

Positioning 1000 the stud 200A on the lower conveyor with a longitudinal extension of the stud 200A oriented in a direction transverse a feeding direction of the lower conveyor.

Measuring 2000, by using a sensor arrangement 160, the curvature of the stud 200A as seen along its longitudinal extension and as seen in a major plane of the conveyor.

Determining 3000, based on input from said measuring, whether or not the stud 200A has an acceptable curvature as seen along its longitudinal extension and as seen in a major plane of the conveyor. The act of determining whether or not the stud 200A has an acceptable curvature may comprise receiving, by a control unit, a signal from the sensor arrangement 160; determining whether or not the stud 200A has an acceptable curvature as seen along its longitudinal extension and as seen in the major plane of the conveyor; and instructing the turning arrangement 170 to turn the stud 200A 180 degrees around its longitudinal extension if it is determined that the stud 200A has a non-acceptable curvature.

Turning 4000 the stud 200A 180 degrees around its longitudinal extension if it is determined that the stud 200A has a non-acceptable curvature. The act of turning the stud 200A may comprise moving at least one pivotable arm 171 from a resting position in which it has no contact with the stud 200A into a turning position in which it engages and lifts a first longitudinal edge portion of the stud 200A to such extent that the stud 200A is turned 180 degrees around its longitudinal extension.

Many modifications of the system are possible without departing from the inventive concept as defined in the appended claims.

It is to be understood that one and the same control unit may be used to control the full system and especially the operation of one or more of the separating arrangement 120, the guide arrangement 130, the positioning arrangement 150, the sensor arrangement 160, the turning arrangement 170 and the cutting arrangement 180.

The invention claimed is:

1. System configured to orient a plurality of studs into one and the same curvature based orientation, the system comprising:
   an upper conveyor comprising an upper surface configured to receive a package of studs;
   a lower conveyor being arranged directly under the upper conveyor, and the lower conveyor having a feeding direction opposite the feeding direction of the upper conveyor;
   a separating arrangement configured to allow one stud at a time to be fed from the package of studs on the upper conveyor onto the lower conveyor with a mutual distance to each other;
   a guide arrangement configured to guide the stud leaving the upper conveyor so that it falls to the lower conveyor in a controlled manner held between a first and a second set of guiding arms without rolling over;
   the lower conveyor being arranged to receive a stud being oriented with its longitudinal extension in a direction transverse to the feeding direction of the lower conveyor;
   a sensor arrangement configured to measure the curvature of the stud as seen along its longitudinal extension and as seen in a major plane of the lower conveyor; and
   a turning arrangement configured to turn the stud 180 degrees around its longitudinal extension.

2. System according to claim 1, wherein the sensor arrangement comprises at least one sensor being a photocell, a laser sensor, a radar sensor, a pressure sensor or an image sensor.

3. System according to claim 1, wherein the sensor arrangement is an array of a plurality of sensors.

4. System according to claim 1, further comprising a control unit, the control unit being configured to receive a signal from the sensor arrangement; determine whether or not the stud has an acceptable curvature as seen along its longitudinal extension and as seen in the major plane of the conveyor; and instruct the turning arrangement to turn the stud if it is determined that the stud has a non-acceptable curvature.

5. System according to claim 1, wherein the turning arrangement comprises at least one pivotable arm configured to be movable from a resting position in which it has no contact with the stud into a turning position in which it engages and lifts a first longitudinal edge portion of the stud to such extent that the stud is turned 180 degrees around its longitudinal extension.

6. System according to claim 1, further comprising a cutting arrangement configured to cut at least one of the two free ends of the stud.

7. Method of orienting a plurality of studs into one and the same curvature based orientation, comprising the acts of:
   arranging a package of studs on an upper conveyor;
   separating, by using a separating arrangement, the plurality of studs arranged in the package of studs, thereby allowing one stud at a time to be fed from the upper conveyor to a lower conveyor with a mutual distance to each other, the lower conveyor being arranged directly under the upper conveyor and the lower conveyor having a feeding direction opposite the feeding direction of the upper conveyor;
   guiding, by using a guide arrangement, the stud leaving the upper conveyor so that the stud falls to the lower conveyor in a controlled manner held between a first and a second set of guiding arms without rolling over;
   positioning the stud on the lower conveyor with a longitudinal extension of the stud oriented in a direction transverse to the feeding direction of the lower conveyor;
   measuring, by using a sensor arrangement, the curvature of the stud as seen along its longitudinal extension and as seen in a major plane of the conveyor;
   determining, based on input from said measuring, whether or not the stud has an acceptable curvature as seen along its longitudinal extension and as seen in a major plane of the conveyor; and
   if it is determined that the stud has a non-acceptable curvature, turning the stud 180 degrees around its longitudinal extension.

8. Method according to claim 7, wherein the act of determining whether or not the stud has an acceptable curvature, comprises:
   receiving, by a control unit, a signal from the sensor arrangement;
   determining whether or not the stud has an acceptable curvature as seen along its longitudinal extension and as seen in the major plane of the conveyor; and instructing the turning arrangement to turn the stud 180 degrees around its longitudinal extension if it is determined that the stud has a non-acceptable curvature.

9. Method according to claim 7, wherein the act of turning the stud, comprises:
moving at least one pivotable arm from a resting position in which it has no contact with the stud into a turning position in which it engages and lifts a first longitudinal edge portion of the stud to such extent that the stud is turned 180 degrees around its longitudinal extension.

10. Use of a system according to claim 1 in an establishment for prefabricated house manufacturing.

\* \* \* \* \*